United States Patent
Chowdhury et al.

(10) Patent No.: US 10,620,050 B2
(45) Date of Patent: Apr. 14, 2020

(54) VIBRATIONAL SUM FREQUENCY GENERATION USING SHAPED NEAR INFRARED LIGHT

(71) Applicant: UT-Battelle, LLC, Oak Ridge, TN (US)

(72) Inventors: Azhad U. Chowdhury, Knoxville, TN (US); Benjamin L. Doughty, Knoxville, TN (US); Daniel A. Lutterman, Knoxville, TN (US); Yingzhong Ma, Oak Ridge, TN (US); Tessa R. Calhoun, Knoxville, TN (US); Brianna R. Watson, Brookline, MA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/292,676

(22) Filed: Mar. 5, 2019

(65) Prior Publication Data

US 2019/0271595 A1     Sep. 5, 2019

Related U.S. Application Data

(60) Provisional application No. 62/638,381, filed on Mar. 5, 2018.

(51) Int. Cl.
*G01J 3/02* (2006.01)
*G01J 3/433* (2006.01)
*G01J 3/10* (2006.01)

(52) U.S. Cl.
CPC ............ *G01J 3/4338* (2013.01); *G01J 3/021* (2013.01); *G01J 3/0224* (2013.01);
(Continued)

(58) Field of Classification Search
CPC ............ G01B 9/02014; G01B 9/02091; G01B 9/02044; G01N 2021/653; G01N 21/65; G01N 2021/656; G01N 21/4795; G01N 21/35; G01N 2021/655; G01N 21/6402; G01N 21/6428; G01N 2021/1793; G01N 21/00; G01N 21/39; G01N 2201/06113; G01N 2021/1706; G01N 2021/1708; G01N 2021/1787; G01N 2021/3125;
(Continued)

(56) References Cited

U.S. PATENT DOCUMENTS

2008/0117416 A1*  5/2008  Hunter ................. A61B 5/0066
                                                              356/301
2009/0161092 A1*  6/2009  Zanni ....................... G01J 3/10
                                                                356/51

(Continued)

OTHER PUBLICATIONS

Roke, S. et al., "Femtosecond sum frequency generation at the metal-liquid interface", Surf. Sci., 2005, pp. 79-88, vol. 593.

(Continued)

*Primary Examiner* — Michael P Stafira
(74) *Attorney, Agent, or Firm* — Scully Scott Murphy & Presser

(57) ABSTRACT

A vibrational sum frequency generation spectroscopy system with pulse shaping is provided. The pulse shaping provides tunable NIR-Shaped light pulses based on user input parameters which may be specified to customize the system for different experimental and testing conditions or needs.

19 Claims, 16 Drawing Sheets

(52) U.S. Cl.
CPC .............. *G01J 3/0229* (2013.01); *G01J 3/108* (2013.01); *G01J 2003/4332* (2013.01)

(58) Field of Classification Search
CPC ..... G01N 2021/3595; G01N 2021/399; G01N 21/1702; G01N 21/1717; G01N 21/276; G01N 21/3577; G01N 21/359; G01N 21/49; G01N 21/636; G01N 21/658; G01N 33/542; G01N 33/54366; G01N 33/54373; G01N 33/56966; G01J 3/433; G01J 11/00; G01J 3/10; G01J 3/44; G01J 3/453; G01J 3/457; G01J 3/0224; G01J 3/00; G01J 3/0205; G01J 3/027; G01J 3/08; G01J 3/12; G01J 3/1256; G01J 3/40; G01J 3/4412; G01J 3/447; G01J 9/02; G01J 2003/4332; G01J 3/021; G01J 3/0229; G01J 3/108; G01J 3/2803; G01J 3/2823; G01J 3/42; G01J 3/4338; G01J 3/45; G01J 3/4531; G01J 9/04; G02B 26/06; G02B 26/0883
See application file for complete search history.

(56) References Cited

U.S. PATENT DOCUMENTS

| | | | | |
|---|---|---|---|---|
| 2010/0265501 | A1* | 10/2010 | Benderskii | G01J 3/4338 356/307 |
| 2010/0321767 | A1* | 12/2010 | Borguet | G02F 1/3544 359/330 |
| 2013/0221222 | A1* | 8/2013 | Baiz | G01N 21/35 250/339.01 |
| 2018/0283950 | A1* | 10/2018 | Ge | G01J 3/433 |

OTHER PUBLICATIONS

Scheu, R. et al., "Toward Vibrational Dynamics at Liquid-Liquid and Nano-Interfaces: Time-Resolved Sum-Frequency Scattering", J. Phys. Chem. B, 2014, pp. 3366-3371, vol. 118.
Allen, H. et al., Molecular Structure and Adsorption of Dimethyl Sulfoxide at the Surface of Aqueous Solutions, J. Phys. Chem. B, 1999, pp. 660-666, vol. 103.
Rao, Y. et al., "Absolute Orientation of Molecules at Interfaces", J. Phys. Chem. B, 2006, pp. 1727-1732, vol. 110.
Ghosh, A. et al., "Two-dimensional sum-frequency generation (2D SFG) spectroscopy: summary of principles and its application to amyloid fiber monolayers", Faraday Discuss, 2015, pp. 493-505, vol. 177.
Ma, G. et al., "Probing water and biomolecules at the air-water interface with a broad bandwidth vibrational sum frequency generation spectrometer from 3800 to 900 cm-1", Applied Spectroscopy, 2009, pp. 528-537, vol. 63, No. 5.
Doughty, B. et al., "Adsorption, Ordering, and Local Environments of Surfactant-Encapsulated Polyoxometalate Ions Probed at the Air-Water Interface", Langmuir, Aug. 2016, pp. 8116-8122, vol. 32, No. 32.
Curtis, A. et al., "Use of Variable Time-Delay Sum-Frequency Generation for Improved Spectroscopic Analysis", Journal of Physical Chemistry, Oct. 2011, pp. 19303-19310, vol. 115, No. 39.
Chen, X. et al., "Interfacial Water Structure Associated with Phospholipid Membranes Studied by Phase-Sensitive Vibrational Sum Frequency Generation Spectroscopy", Journal of American Chemistry Society, Aug. 2010, pp. 11336-11342, vol. 132, No. 32.
Voylov, D. et al., "Unraveling the Molecular Weight Dependence of Interfacial Interactions in Poly(2-vinylpyridine)/Silica Nanocomposites", ACS Macro Letters, 2017, pp. 68-72, vol. 6, No. 2.
Doughty, B. et al., "Absolute Molecular Orientation of Isopropanol at Ceria (100) Surfaces: Insight into Catalytic Selectivity from the Interfacial Structure", Journal of Physical Chemistry, 2017, pp. 14137-14146, vol. 121, No. 26.
Tan, S. et al., "Insight into the Selectivity of Isopropanol Conversion at Strontium Titanate (100) Surfaces: A Combination Kinetic and Spectroscopic Study", ACS Catalysis, 2017, pp. 8118-8129, vol. 7, No. 12.
Wang, H. et al., "Quantitative spectral and orientational analysis in surface sum frequency generation vibrational spectroscopy (SFG-VS)", International Reviews in Physical Chemistry, 2005, pp. 191-256, vol. 24, No. 2.
Laaser, J. et al., "Time-domain SFG spectroscopy using mid-IR pulse shaping: Practical and intrinsic advantages", Journal of Physical Chemistry, 2011, pp. 2536-2546, vol. 115, No. 11.
Han, Y. et al, "Mapping molecular orientation with phase sensitive vibrationally resonant sum-frequency generation microscopy", Journal of Physical Chemistry, 2013, pp. 6149-6156, vol. 117, No. 20.
Wang, H. et al., "Quantitative sum-frequency generation vibrational spectroscopy of molecular surfaces and interfaces: lineshape, polarization, and orientation", Annu. Rev. Phys. Chem., Apr. 2015, pp. 189-216, vol. 66, No. 1.
Lagutchev, A. et al., "Compact broadband vibrational sum-frequency generation spectrometer with nonresonant suppression", Spectrochimica Acta Part A: Molecular and Biomolecular Spectroscopy, 2010, pp. 1289-1296, vol. 75, No. 4.
Weeraman, C. et al., "Vibrational sum frequency generation spectroscopy using inverted visible pulses", Optics Express, May 2010, pp. 11483-11494, vol. 18, No. 11.
Stiopkin, I. et al., "Temporal effects on spectroscopic line shapes, resolution, and sensitivity of the broad-band sum frequency generation", Journal of Chemical Physics, Jun. 2010, pp. 234503-1 to 234503-9, vol. 132, No. 23.
Ma, G. et al., "Diffuse reflection broad bandwidth sum frequency generation from particle surfaces", Journal of American Chemistry Society, 2002, pp. 9374-9375, vol. 124, No. 32.
Xu, B. et al., "Stabilized phase detection of heterodyne sum frequency generation for interfacial studies", Optics Letters, Oct. 1, 2015, pp. 4472-4475, vol. 40, No. 19.
Peñalber, C. et al., "Observation of charge inversion of an ionic liquid at the solid salt-liquid interface by sum frequency generation spectroscopy", Journal of Physical Chemistry Letters, 2012, pp. 844-847, vol. 3, No. 7.
Shalhout, F. et al., "Relative Phase Change of Nearby Resonances in Temporally Delayed Sum Frequency Spectra", Journal of Physical Chemistry Letters, Dec. 2012, pp. 3493-3497, vol. 3, No. 23.
Braunschweig, B. et al., "Sum-frequency generation of acetate adsorption on Au and Pt surfaces: Molecular structure effects," Journal of Chemical Physics, 2010, pp. 234702-1 to 234702-8, vol. 133, No. 23.
Calhoun, T. et al., "Vibrationally-Mediated Dynamics in β-carotene Probed with Broadband 2D Electronic Spectroscopy", Spectroscopy, Jul. 2010, pp. 1-2, vol. 1.
Vaughan, J. et al., "Diffraction-based femtosecond pulse shaping with a two-dimensional spatial light modulator", Optics Letters, Feb. 2005, pp. 323-325, vol. 30, No. 3.
Dou, S. et al., "Comparison between collinear and noncollinear phase matching for second-harmonic and sum-frequency generation in 3-methyl-4-nitropyridine-1-oxide", Journal of Optical Society of America, 1992, p. 687-697, vol. 9, No. 5.
Zheng, D. et al., "Compressive Broad-Band Hyperspectral Sum Frequency Generation Microscopy to Study Functionalized Surfaces", Journal of Physical Chemistry Letters, 2016, pp. 1781-1787, vol. 7, No. 10.
Vaughan, J. et al., "Analysis of replica pulses in femtosecond pulse shaping with pixelated devices", Optics Express, 2006, pp. 1314-1328, vol. 14, No. 3.
Weiner, A., "Ultrafast optical pulse shaping: a tutorial review", Optics Communications, 2011, pp. 3669-3692, vol. 284, No. 15.
Wilson, J. et al., "Ultrafast phase and amplitude pulse shaping with a single, one-dimensional, high-resolution phase mask", Optics Express, Jul. 9, 2007, p. 8979-8987, vol. 15, No. 14.
Shim, S. et al., "How to turn your pump-probe instrument into a multidimensional spectrometer: 2D IR and Vis spectroscopies via pulse shaping", Physical Chemistry Chemical Physics, Feb. 7, 2009, pp. 748-761, vol. 11, No. 5.

(56) References Cited

OTHER PUBLICATIONS

Calhoun, T. et al., "The separation of overlapping transitions in β-carotene with broadband 2D electronic spectroscopy", Chemical Physics Letters, 2012, pp. 1-5, vol. 523.

Weiner, A., "Femtosecond pulse shaping using spatial light modulators", Review of Science Instruments, May 2000, pp. 1929-1960, vol. 71, No. 5.

Vaughan, J. et al., "Automated two-dimensional femtosecond pulse shaping", J. Opt. Soc. Am. B, Oct. 2002, pp. 2489-2495, vol. 19, No. 10.

Popmintchev, T. et al., "Bright Coherent Ultrahigh Harmonics in the keV X-ray Regime from Mid-Infrared Femtosecond Lasers", Science, Jun. 8, 2012, pp. 1287-1291, vol. 336.

Efimov, A. et al., "Adaptive control of femtosecond soliton self-frequency shift in fibers", Optics Letters, Feb. 1, 2004, pp. 271-273, vol. 29, No. 3.

Zheng, D. et al., "Chemical Imaging of Self-Assembled Monolayers on Copper Using Compressive Hyperspectral Sum Frequency Generation Microscopy", J. Phys. Chem. B, 2018, pp. 464-471, vol. 122.

Higgins, K. et al., "Compressed supercontinuum probe for transient absorption microscopy", Optics Letters, Apr. 15, 2018, pp. 1750-1753, vol. 43, No. 8.

Vacano, B. et al., "Actively shaped supercontinuum from a photonic crystal fiber for nonlinear coherent microspectroscopy", Optics Letters, Feb. 1, 2006, pp. 413-415, vol. 31, No. 3.

Lagutchev, A. et al., "Nonresonant Background Suppression in Broadband Vibrational Sum-Frequency Generation Spectroscopy", J. Phys. Chem. C, 2007, pp. 13645-13647, vol. 111, No. 37.

Turner, D. et al., "Invited Article: The coherent optical laser beam recombination technique (COLBERT) spectrometer: Coherent multidimensional spectroscopy made easier", Review of Scientific Instruments, 2011, pp. 081301-1 to 081301-22, vol. 82.

Grumstrup, E. et al., "Facile collection of two-dimensional electronic spectra using femtosecond pulse-shaping technology", Optics Express, Dec. 10, 2007, pp. 16681-16689, vol. 15, No. 25.

Chowdhury, A. et al., "Flexible approach to vibrational sum-frequency generation using shaped near-infrared light", Optics Letters, May 1, 2018, pp. 2038-2041, vol. 43, No. 9.

Doughty, B. et al., "Probing Interfacial Electronic States in CdSe Quantum Dots Using Second Harmonic Generation Spectroscopy", J. Phys. Chem. C, 2015, pp. 2752-2760, vol. 119.

De Beer, A. et al., "Sum frequency generation scattering from the interface of an isotropic particle: Geometrical and chiral effects", Physical Review B, 2007, pp. 245438-1 to 245438-8, vol. 75.

Jayathilake, H. et al., "Molecular Order in Langmuir-Blodgett Monolayers of Metal-Ligand Surfactants Probed by Sum Frequency Generation", Langmuir, 2009, pp. 6880-6886, vol. 25, No. 12.

Patrow, J. et al, "Interfacial Lewis Acid-Base Adduct Formation Probed by Vibrational Spectroscopy", J. Phys. Chem Letters, 2018, pp. 3631-3638, vol. 9.

Baldelli, S., "Interfacial Structure of Room-Temperature Ionic Liquids at the Solid-Liquid Interface as Probed by Sum Frequency Generation Spectroscopy", J. Phys. Chem. Letters, 2013, pp. 244-252, vol. 4.

Das, S. et al., "Interfacial Surfactant Ordering in Thin Films of SDS-Encapsulated Single-Walled Carbon Nanotubes", J. Phys. Chem. Letters, 2016, pp. 320-326, vol. 7.

Graham, M. et al., "Two-Dimensional Electronic Spectroscopy Reveals the Dynamics of Phonon-Mediated Excitation Pathways in Semiconducting Single-Walled Carbon Nanotubes", Nano Letters, 2012, pp. 813-819, vol. 12.

Wei, F. et al., "Laser Linewidth and Spectral Resolution in Infrared Scanning Sum Frequency Generation Vibrational Spectroscopy System", Chinese J. Chem. Phys., Apr. 27, 2016, vol. 29, No. 2.

Fu, L. et al., "Validation of Spectra and Phase in Sub-1 cm-1 Resolution Sum-Frequency Generation Vibrational Spectroscopy through Internal Heterodyne Phase-Resolved Measurement", J. Phys. Chem. B, 2016, pp. 1579-1589, vol. 120.

Mifflin, A. et al., "Accurate Line Shapes from Sub-1 cm-1 Resolution Sum Frequency Generation Vibrational Spectroscopy of α-Pinene at Room Temperature", J. Phys. Chem. A, 2015, pp. 1292-1302, vol. 119.

Velarde, L. et al., "Coherent Vibrational Dynamics and High-resolution Nonlinear Spectroscopy: A Comparison with the Air/DMSO Liquid Interface", Chinese J. Chem. Phys., Dec. 27, 2013, pp. 710-720, vol. 26.

\* cited by examiner

Etalon; R = 0.95, theta = 3.997, delay = 250 fs

VIBRATIONAL SUM FREQUENCY GENERATION USING SHAPED NEAR INFRARED LIGHT

CROSS REFERENCE TO RELATED APPLICATION

The present application claims benefit of U.S. Provisional Application No. 62/638,381, filed on Mar. 5, 2018, all of the contents of which are incorporated herein by reference.

GOVERNMENT SUPPORT

This invention was made with government support under Prime Contract No. DE-AC05-00OR22725 awarded by the U.S. Department of Energy and National Institute of General Medical Sciences (NIGMS) under grant number R15 GM119111. The government has certain rights in the invention.

FIELD OF THE DISCLOSURE

This disclosure relates to vibrational sum-frequency generation spectroscopy. More particularly, the disclosure relates to a system, methods and programs for generating tunable light pulses based on user defined parameters that may be combined with infrared light pulses for vibrational sum-frequency generation spectroscopy.

BACKGROUND

Vibrational sum frequency generation (vSFG) spectroscopy is used as a tool for selectively probing chemical composition, molecular dynamics, orientation and ordering at interfaces. However, there exist several limitations that prevent its wide spread adoption. For example, a spectrometer is typically designed for a specific system, or set of similar systems, in mind. Therefore, the system is not flexible. However, experiments aimed at studying, e.g., polymer interfaces, tend to have different requirements than those probing small molecules on metallic or semiconducting interfaces. A consideration in the design phase for the static system is tied to the decision of how to generate narrowband up-conversion pulses that ultimately dictate the spectral resolution and impact the line shapes of resolved bands in the SFG spectrum.

SUMMARY

Accordingly, disclosed is a system that is able to generate tunable near infrared (NIR) light pulses that may be specified to match experimental requirements without a need for any changes in an optical alignment.

The system comprises a near infrared (NIR) light source configured to emit light pulses centered at a preset wavelength, a beam splitter disposed in a path of the emitted light and configured to split the emitted light into first light pulses and second light pulses, an optical parametric amplifier (OPA) disposed in a path of the first light pulses and configured to convert the first light pulses into a Mid-IR light pulses via difference frequency mixing, a pulse shaper disposed in a path of the second light pulses and configured to output tunable NIR light pulses, by adjusting at least one of a number of spectral components, an amplitude and phase of the second light pulses, a processor configured to control the pulses shaper based on mode specific parameters input by a user via a user interface, an optical system configured to combine the Mid-IR light pulses output by the OPA which has been polarized and rotated and the tunable NIR light pulses output by the pulses shaper which has been polarized and rotated, a lens configured to focus the combined light onto a target sample, and a light detector configured to detect light reflected by the target sample which has been focused, polarized and rotated.

The mode specific parameters are specific to a mode of operation. In an aspect of the disclosure, the mode of operation comprises symmetric and asymmetric mode. When in the symmetric mode, the pulses shaper is configured to output time-symmetric pulses. When in the asymmetric mode, the pulses shaper is configured to output time-asymmetric pulses.

In an aspect of the disclosure, the asymmetric mode is selected when the target sample is located on a metallic or semiconducting surface. In an aspect of the disclosure, the symmetric mode is used when the target sample is located on an insulating surface.

In an aspect of the disclosure, the pulse shaper comprises a transmission grating, a folding mirror, a cylindrical mirror and a liquid crystal on silicon spatial light modulator (LCOS SLM). The transmission grating is disposed in the path of the second light pulses and configured to separate the second light pulses into its spectral components forming a dispersed beam. The folding mirror is configured to reflect the dispersed beam. The cylindrical mirror is configured to focus the dispersed beam which has been reflected by the folding mirror. The LCOS SLM is configured to receive the dispersed beam and adjust at least one of a number of spectral components, an amplitude and phase of the second light pulses.

In an aspect of the disclosure, the LCOS SLM is disposed on a Fourier plane of the dispersed and focused beam. The LCOS SLM produces a plurality of rows and columns of pixels.

In an aspect of the disclosure, when in a symmetric mode, the mode specific parameters comprise a slit width and a center wavelength. The slit width is a number of columns of pixels allowed. A number of spectral components in the tunable NIR light pulses are determined by the slit width.

In an aspect of the disclosure, the processor is configured generated a phase mask for the LCOS SLM based the slit width and the center wavelength. In an aspect of the disclosure, the amplitude and the phase for each column of pixels included in the phase mask is the same. In other aspects, the amplitude and the phase may be different. In other aspects, multiple slits may be used to generate the different amplitudes and phases.

In an aspect of the disclosure, when in the asymmetric mode, a virtual etalon is generated. The mode specific parameters comprise a reflectance and a virtual tilt angle. A decay time is based on the reflectance and a center wavelength is based on the virtual tilt angle.

In an aspect of the disclosure, the processor is configured to generate a phase mask for the LCOS SLM based on the reflectance and the virtual tilt angle.

In an aspect of the disclosure, the processor is further configured to generate the phase mask to delay the tunable NIR-Shaped light pulses with respect to the Mid-IR light pulses by adding a linear phase to each column of pixels.

In an aspect of the disclosure, the system further comprises a user interface. The user interface is configured to receive a mode selection for the mode of operation and the mode specific parameters.

In an aspect of the disclosure, the system further comprises a delay mirror system disposed in the path of one of the first light pulses and the second light pulses. The delay mirror system is configured to cause the tunable NIR light pulses output by the pulse shaper and the Mid-IR light pulses output by the OPA to reach the target sample at the controllable times.

DRAWINGS

DETAILED DESCRIPTION

Figure 1:
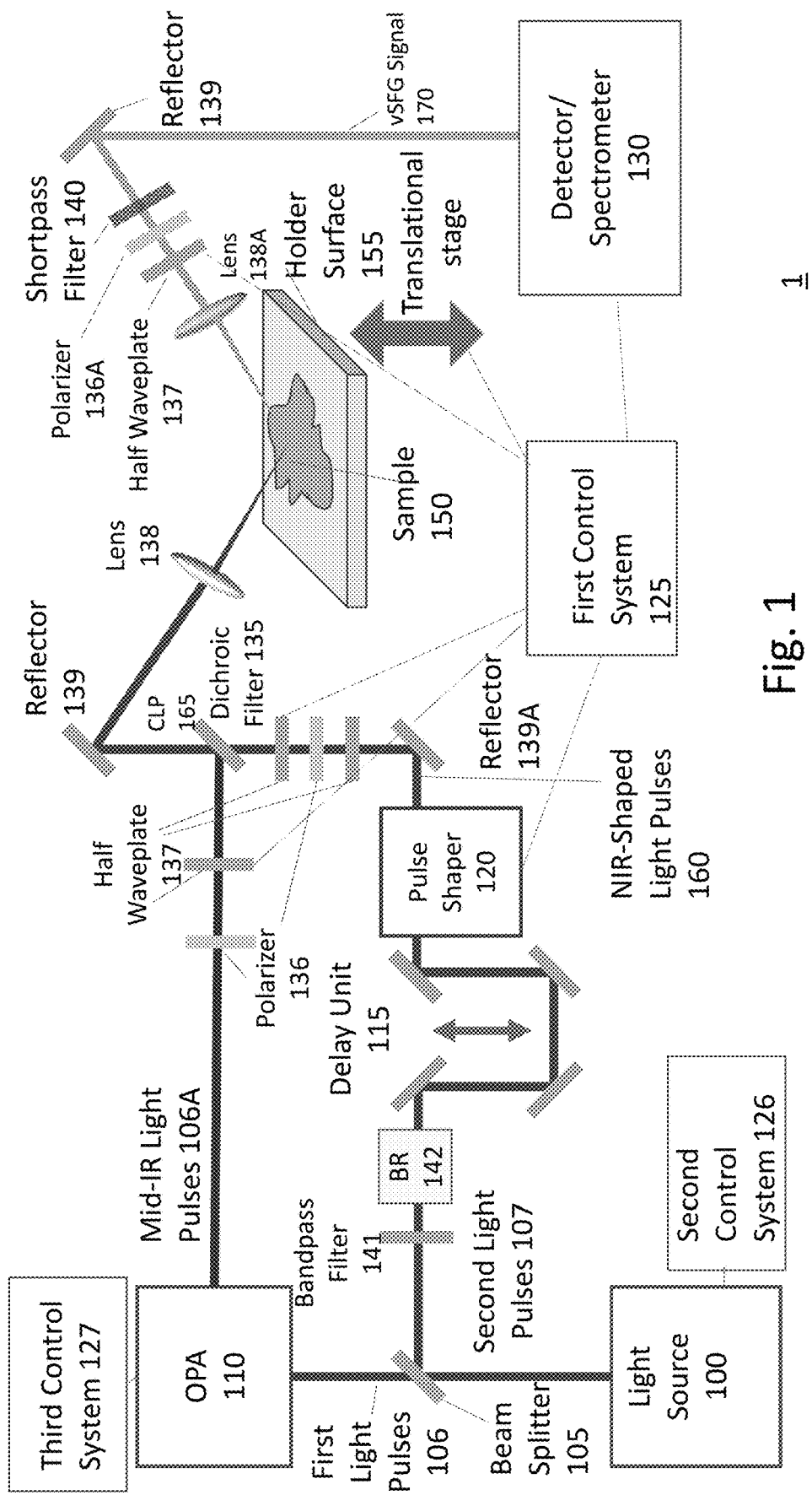
FIG. 1 depicts a vibrational sum frequency generation spectroscopy system in accordance with aspects of the disclosure.

The system 1 makes use of two sets of pulses, one set being mid-infrared (IR) and another set in the NIR spectral regions, that are temporally and spatially overlapped at an interface (target sample) of interest. The Mid-IR light pulses create a vibrational coherence in the target sample that oscillates at a driving frequency. The second pulses are then introduced to create a second order polarization in the target sample that oscillates at the sum or difference frequencies between the incident fields, and thereby generating new frequencies of light ($\omega_{SFG}=\omega_{IR}+\omega_{NIR}$). The signal intensity received at the detector/spectrometer 130 is proportional to a square of second order nonlinear effective susceptibility, $\chi_{eff}^{(2)}$, of the sample and incident field ($E_\omega$) strength.

$$I_{SFG}=|E^{SFG}|^2 \propto |\chi_{eff}^{(2)} E_{IR} E_{NIR}|^2 \qquad (1)$$

The effective second order nonlinear susceptibility is the sum of the resonant and nonresonant contributions which is given by:

$$\chi_{eff}^{(2)} = \chi_{NR}^{(2)} + \chi_{res}^{(2)} = \chi_{NR}^{(2)} + \sum_k \frac{A_k}{\omega_{IR} - \omega_k + i\Gamma_k} \qquad (2)$$

In the system 1, the spectral resolution is a function of up-converting light pulses from a light source 100. In an aspect of the disclosure, this is achieved by the pulse shaper 120 (which will be described in detailed latter).

FIG. 1 shows a schematic view of the system 1 in accordance with aspects of the disclosure. The light source 100 may be a laser. In an aspect of the disclosure, the light source may be 800 nm. For example, the light source 100 may be a regenerative amplifier system (Spectra Physics Spitfire Ace), which was seeded with a femtosecond Ti:Sapphire oscillator (Mai-Tai) to produce ~6 W of average power at a 1 kHz repetition rate with typically 42 fs pulses.

The pulses from the light source 100 are separated into two different paths: a first path and a second path. A beam splitter 105 is positioned in the path of the pulses from the light source 100 and separates the light pulses into two light pulses: first light pulses 106 and second light pulses 107. For example, a fixed ratio beam splitter may be used. In an aspect of the disclosure, the higher power light pulses are the first light pulses 106. For example, the first light pulses may be ~3.4 W.

An optical parametric amplifier (OPA) 110 is positioned in the first path. The OPA 110 receives the first light pulses 106. The OPA 110 may be a TOPAS-Prime Plus optical parametric amplifier and difference frequency mixer. The OPA 110 produces Mid-IR light pulses 106A (also referred to herein as broadband mid-IR pump pulses). The center wavelength may be tuned or customized as needed. For example, the center wavelength may be ~2900 $cm^{-1}$. The center wavelength is a function of the set wavelength used in the difference frequency mixing in the OPA 110. For example, the OPA 110 may have a wide tuning range spanning from ~900 $cm^{-1}$ to <4000 $cm^{-1}$. As such, it is possible to probe a wide range of vibrational modes as needed. A change in the central frequency may require minors change in optical alignment.

In an aspect of the disclosure, the spectral bandwidth may also be adjusted. For example, the spectral bandwidth may be greater than 300 cm-1.

The second light pulses 107 are used to generate the NIR-Shaped light pulses 160 (via the pulse shaper 120). Therefore, if ~6 W average power light source 100 is used, the average power of the second light pulses 107 may be ~1.2 W.

The system 1 optionally comprises a bandpass filter 141 (which is shown in FIG. 1 in the system schematic). For example, the bandpass filter 141 may be obtained from Thorlabs as part number FBH800-10. The bandpass filter 141 may be positioned along the second path and filters the second light pulses 107. The bandpass filter 141 reduces the intensity of the second light pulses 107 (e.g., 800 nm) below a breakdown/self-phase modulation threshold. This makes the design of a telescope (beam reducer 142) less demanding. Additionally, vSFG requires narrowband NIR light and a broad NIR spectral window is not necessary.

The bandpass filter 141 may not be used in systems where ultrashort double pulses are used.

The system 1 also comprises a beam reducer 142. The beam reducer 142 is also positioned along the second path. The beam reducer 142 reduces the diameter of the second light pulses 107. For example, the beam reducer 142 may be a 2× reducing telescope.

The system 1 also comprises a delay unit 115. As depicted, the delay unit 115 is positioned along the second path to delay the second light pulses 107 (between the beam reducer 142 and the pulse shaper 120. However, in other aspects of the disclosure, the delay unit 115 may be positioned on the first path to delay the Mid-IR light pulses 106A. In yet other aspects of the disclosure, the delay unit 115 may be positioned between the beam splitter 105 and the OPA 110 to delay the first light pulses 106. The delay unit 115 is configured to delay light pulses such that the Mid-IR light pulses 106A and the NIR-Shaped light pulses 160 reach the sample 150 at a controllable timing.

In an aspect of the disclosure, the delay unit 115 comprises a plurality of reflectors. As depicted in FIG. 1, there are four reflectors, where the bottom two are retroreflectors. The retroreflectors are mounted on a motorized stage (not shown), where the bottom two may be linearly translated to change the delay time. The depicted orientation of mirrors is only for example and other orientations may be used. The second light pulses 107 (delayed) are coupled into the pulse shaper 120 (also referred to herein as NIR Input pulse 202 in FIG. 2).

Figure 2:
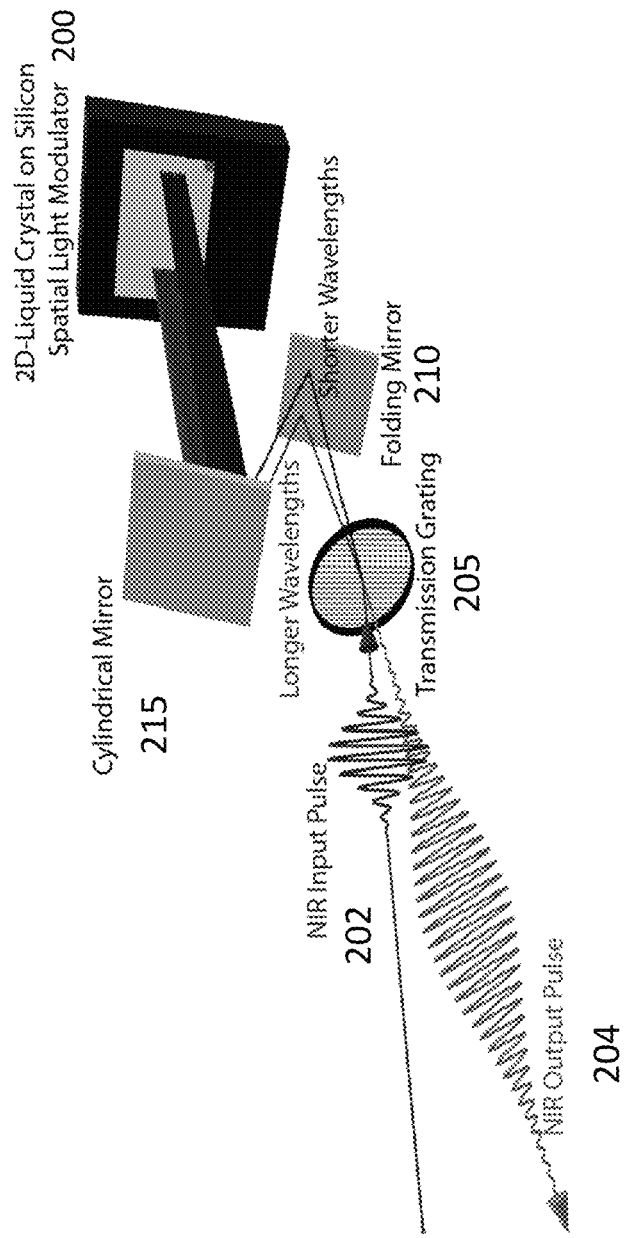
FIG. 2 depicts a pulse shaper in accordance with aspects of the disclosure.

FIG. 2 depicts the pulse shaper 120 in accordance with aspects of the disclosure. In an aspect of the disclosure, the pulse shaper 120 is a 4f-pulse shaper. 4-f means that the distance between certain components is the same and determined by the focal length of the cylindrical mirror 215. The pulse shaper 120 comprises a transmission grating 205, a folding mirror 210, the cylindrical mirror 215 and a Liquid Crystal on Silicon Spatial Light Modulation LCOS SLM 200. The transmission grating 205 separates the NIR input pulse 202 into its spectral components. As shown in FIG. 2, longer wavelengths and shorter wavelengths are separated. The transmission grating 205 may be obtained from Wasatch Photonics as part number WP-1200/840-25.4. The transmission grating 205 may be rotatably mounted (not shown). In an aspect of the disclosure, the transmission grating 205 is rotated to maximize diffraction efficiency and orientation relative to the optical table (i.e., in the horizontal plane).

The folding mirror 210 is positioned in the dispersed beam's path. The folding mirror 210 may be a flat mirror that reflects the dispersed beam back at an upward angle toward the cylindrical mirror 215. In an aspect of the disclosure, the folding mirror 210 is angled such that the dispersed beam is directed to the bottom of the cylindrical mirror 215.

The cylindrical mirror 215 may be coated. In an aspect of the disclosure, the coating may be silver. The cylindrical mirror 215 may be obtained from Lambda Research Optics, as part number PAG-CYLC-25.4×25.4B-200. The cylindrical mirror 215 has a set focal length. In an aspect of the disclosure, the focal length may be 100 mm. The cylindrical mirror 215 focuses the individual spectral components of the NIR input light 202 (also referenced herein as second light pulses 107) along the horizontal dimension of the LCOS SLM 200.

The LCOS SLM 200 may be obtained from Hamamatsu, 2D-LCOS-SLM, as part number model X10468-02). The LCOS SLM 200 is positioned at the Fourier plane. The Fourier plane is the spatial location where the individual frequency components are focused.

In an aspect of the disclosure, the LCOS SLM 200 may be rotatably mounted on a precision linear stage with a tip-tilt-rotation mount (not shown) to optimize its position and ensure that all LCOS SLM pixels are precisely in the Fourier plane.

The pulse shaper 120 (and in particular the LCOS SLM 200) is controlled by the first control system 125. The LCOS SLM 200 includes liquid crystals for each pixel. The pixels are arranged in columns and rows. A given pixel is controlled by a voltage. The voltage rotates the liquid crystal. In an aspect of the disclosure, the first control system 125 may generate a grating pattern (diffraction pattern), which is a sawtooth phase pattern along the vertical pixel direction. In this pattern, greyscale values are specified by a control box which is coupled to a LCOS SLM 200. The greyscale values correspond to calibrated phase values. The LCOS SLM 200 converts the greyscale into a voltage that is applied to the pixels along the vertical dimension of the SLM. Manipulation of the sawtooth pattern depth and offset allows for the application of a mask that is applied to the LCOS SLM 200 to control the amplitude and phase of the spectral components. Light that does not interact with the liquid crystals or does not see a pattern simply reflects off the modulator and propagates back along the input path.

Under the control of the first control system 125, light pulses are reflected back from the LCOS SLM 200 (modulated in amplitude and/or phase and number of spectral components). The light returns via the cylindrical mirror 215, the folding mirror 210 and transmission grating 205. The modulated (adjusted spectral components) are recombined via the transmission grating 215 and form the NIR output pulse 204 (also referred to as NIR-Shaped light pulses 160).

In another aspect of the disclosure, instead of an LCOS SLM 200, an acousto-optical modulation (AOM) may be used.

The system 1 further comprises a reflector 139A configured to direct the NIR-Shaped light pulses 160 toward the Mid-IR light pulses 106A for combination. For example, the reflector 139A is angled with respect to the pulse shaper 120 to direct the NIR-Shaped light pulses 160 to a dichroic filter 135 for combination with the Mid-IR light pulses 106A. The reflector 139A acts as a pickoff mirror. The diffraction pattern in the phase mask along the vertical direction of the SLM to divert light to reach the pick off mirror, Each of the Mid-IR light pulses 106A and NIR-Shaped light pulses 160 may be rotated and polarized (purified). For example, a polarizer 136 and a half waveplate 137 is positioned along the first path to polarize and rotate the Mid-IR light pulses 106A. As depicted, the polarizer 136 is before the half waveplate 137; however, in other aspects of the disclosure, the order may be reversed. The polarizer 136 causes the orientation to be aligned and the half waveplate 137 rotates the polarization.

Similarly, a polarizer 136 and a half waveplate 137 are positioned along the second path to polarize and rotate polarization of the NIR-Shaped light pulses 160.

The half waveplates 137 are rotatably mounted on a motorized mount (not shown). The first control system 125 may control the rotation of the half waveplates 137 as needed. This control may use an external control box for controlling a motor. For example, the rotation may include a S-polarization or a P-polarization. The first control system 125 may independently control the rotation of the Mid-IR light pulses 106A and NIR-Shaped light pulses 160. In other aspects of the disclosure, the half waveplates 137 may be manually rotated.

In accordance with aspects of the disclosure, a second half waveplate 137 is positioned in the second path for the NIR-Shaped light pulses 160 (before the polarizer 136). The second half waveplate 137 reduces the power of the pulses 160. This allows for control over the intensity of the NIR light to avoid sample 150 damage, if needed. In other aspects of the disclosure, the second half waveplate 137 may be omitted (depending on the sample).

The Mid-IR light pulses 106A and NIR-Shaped light pulses 160 (after polarization and rotation) are combined using the dichroic filter 135 (mirror). For example, the dichroic filter 135 may be obtained from ISP Optics, as part No. BSP-DI-25-2.

The combined light pulses (CLP) 165 is directed toward the sample 150 by another reflector 139. The reflector 139 is angled to align with a lens 138. The lens 138 may be a $CaF_2$ lens. The lens 38 may have a focal length of 150 mm. However, other lens and focal lengths may be used. The lens 138 may be angled with respect to the sample 150.

The sample 150 may be mounted to a holder (surface 155). The holder may move up and down on a translational stage. In an aspect of the disclosure, the sample height may be controlled via a stepper motor (not shown) to allow for precise and reproducible positioning of the sample with respect to the CLP 165 and outgoing optical components. The stepper motor may be controlled by the first control system 125.

The system 1 further comprises collection optics. The collection optics comprises a lens 138A, a half waveplate 137, a polarizer 136A and a shortpass filter (SPF) 140. In an aspect of the disclosure, the lens 138A may be an air-spaced achromatic doublet with a 150 mm focal length. The lens 138A re-collimates the vSFG signal 170. The vSFG 170 is polarization rotated using a half waveplate 137. The half waveplate 137 may be the same as described above. In other aspects of the disclosure, an achromatic half waveplate may be used. Like described above, the first control system 125 may control the rotation of the half waveplate 137 as needed.

The polarizer 136A may be a calcite Glan-Taylor polarizer with a 100,000:1 contrast ratio. This resolves the polarization. The combination of the half waveplate and polarizer in this configuration ensures that the reflection of light from subsequent mirrors and gratings is constant regardless of the polarization of vSFG light that is measured.

Subsequently, vSFG 170 is separated using a short-pass filter 140. The SPF 140 may be tuned to 785 nm. For example, the SPF 140 may be obtained from Semrock, as part No. SP01-785RU-25. The specific wavelength described herein is for example only and other wavelength filters may be used. For example, a 750 nm shortpass filter may be used.

The system 1 also comprises another reflector 139 that directs the collimated, polarization resolved, and filtered vSFG 170 to the detector/spectrometer 130.

The detected/spectrometer 130 comprises a CCD camera and a spectrograph. For example, the spectrograph may be an Acton SpectraPro SP-2300 spectrograph using a pair of quartz (f=50 mm and f=15 mm) cylindrical lenses (Eksma Optics). The CCD camera may be a Pixis 256E CCD camera with hardware binning along the vertical direction for a specified region of interest (ROI) that consisted of 10 vertical pixels.

Figure 3:
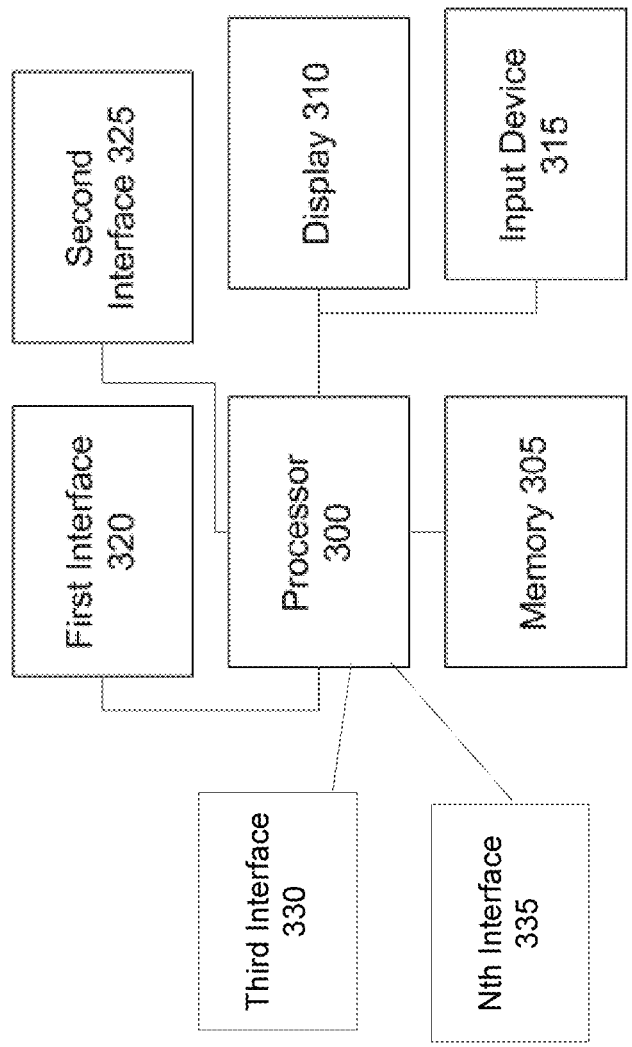
FIG. 3 depicts a first control system in accordance with aspects of the disclosure.

FIG. 3 shows a block diagram of the first control system 125 in accordance with aspects of the disclosure. The first control system 125 may comprise a processor 300, a memory 305, a display 310, an input device 315 and a plurality of interfaces 320-335. The dotted lines in FIG. 1 represented control signals/commands to the respectfully elements and/or information signals from the same.

The term "processor" used herein refers to any component or group of components that individually or collectively execute the functionality described herein. For example, the processor 300 may be a CPU, GPU, ASIC, analog circuit, or other functional logic, such as a FPGA, PAL or PLA. In the case of a CPU or GPU, the CPU or GPU may be executing instructions that are programmed in a computer readable storage device, such as a memory 305.

The memory 305 may be, but not limited to, RAM, ROM and persistent storage. The memory is any piece of hardware that is capable of storing information, such as, for example without limitation, data, programs, instructions, program code, and/or other suitable information, either on a temporary basis and/or a permanent basis. As shown in FIG. 3, the processor 300 is separate from the memory 305, however, the processor and memory may be integrated into the same structural component.

In accordance with aspects the disclosure, the memory 305 contains computer readable instruction (in the form of program(s) or module(s) which enables the processor 300 to perform the functionality described herein. For example, the memory 305 may include program(s) or module(s) for controlling the LCOS SLM 200, receiving and processing input from the detector/spectrometer 130, controlling the translational stage of the sample holder, independently controlling the rotation of the polarization of the Mid-IR light pulses 106A, NIR-Shaped light pulses 160 and vSFG 170 via the half waveplates and movement of the retroreflectors in the delay unit 115 to change the delay.

The memory 305 may also include program(s) or modules(s) for displaying screens on the display 310. The screens may include the mode selection screen 400 and the mode specific parameter input screen 500. The screens may also include a main selection screen for selecting/inputting a delay for the delay unit 115 and a polarization for each of the half waveplates. The delay and polarization may be entered via different screens. In another aspect of the disclosure, another screen may be displayed to control the height of the sample, e.g., linear translation.

The input device 315 is a user input device configured to receive input such as a keyboard, a mouse, a microphone, etc. The input device 315 and the display 310 may coincide in the form of a touch screen.

The plurality of interfaces 320-335 may be connection ports. For example, the processor 300 may be connected to the LCOS SLM 200 using a DVI video cable connected to the first interface 320 (port). The processor 300 may be connected to the detector/spectrometer via a USB cable connected to the second interface 325 (USB port). The processor 300 may be connected to the stepper motor controlling the translational stage via the third interface 330. The processor 300 may be connected to the half waveplates, respectively, via one of the additional interfaces, which may be via a USB cable in a USB port.

The second control system 126 and the third control system 127 comprise similar components. For example, the second control system 126 comprises a processor configured to control the light source 100. The processor is connected to the light source 100 via a serial connection connected to an interface. The third control system 127 comprises a processor configured to control the OPA 110. The processor is connected to the OPA 110 via a USB connection connected to an interface. For example, the processor may change the center wavelength of the Mid-IR light pulse 106A.

In accordance with aspects of the disclosure, the processor 300 may control the LCOS SLM 200 to modulate or adjust the number of spectral components, the amplitude and/phase on a disperse beam of light to generate the tunable NIR-Shaped light pulses out of the pulse shaper 120 as needed to account for actual conditions including type of sample and holder surface (substrate) 150.

In accordance with aspects of the disclosure, the user or operator of the system 1 may specify these conditions in the form of modes of operation and mode specific parameters which may be input via the input device 315.

There is a plurality of modes of operation. The modes of operation include at least a symmetric mode and an asymmetric mode. The modes of operation may also include a delay mode. The delay mode may be combined with either the symmetric mode or the asymmetric mode. In asymmetric mode, time-asymmetric pulses may be generated by the LCOS SLM 200 (and therefore by the pulse shaper 120). These asymmetric pulses are generated by a virtual etalon in the LCOS SLM 200. The asymmetric pulses may be used for studies at metallic interfaces to suppress the nonresonant response of the substrate. However, asymmetric pulses may distort the resulting spectral line shapes and have limited spectral resolution. In the symmetric mode, symmetric (Gaussian shaped) pulses are used. These pulses do not distort a resulting spectral line shape but are affected by nonresonant responses of the substrate and probing weak signals from small molecules on metallic or semiconducting interfaces are difficult. While this disclosure discusses symmetric and asymmetric modes (and delay mode), other modes may be implemented, including, but not limited to, ultrashort double pulses and pulse trains. Double pulses, or generation of any number of pulses, can be generated by appropriate phase and amplitude masks to the LCOS SLM 200. Additionally, the asymmetric mode may include a forward or reverse time asymmetric mode. The difference in forward and reverse etalon is the direction of the decaying field propagates in time: in the forward direction—the field decays as the time delay increases, where as the reverse etalon has an increasing intensity with time delay up until a user defined time delay.

Figure 4:
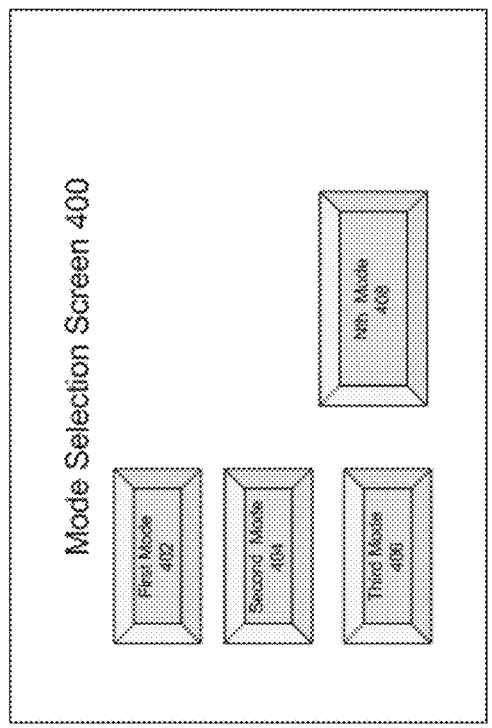
FIG. 4 depicts an example of a mode selection screen in accordance with aspects of the disclosure.

As noted above, the user may specify the mode. For example, the processor 300 may cause the display 310 to display a mode selection screen 400 (example of which is shown in FIG. 4). The mode selection 400 may have a plurality of buttons 402, 404, 406, 408 for selecting a specific mode. Selection buttons are shown for example only and other selection means may be used. Also First-Nth mode is also shown for example, and the screen may list the names of the specific modes. For example, the name of the specific mode may be symmetric mode. However, the mode may have other names such as "Gaussian shape" or the like and the name of the mode is not limited to the example.

Figure 5:
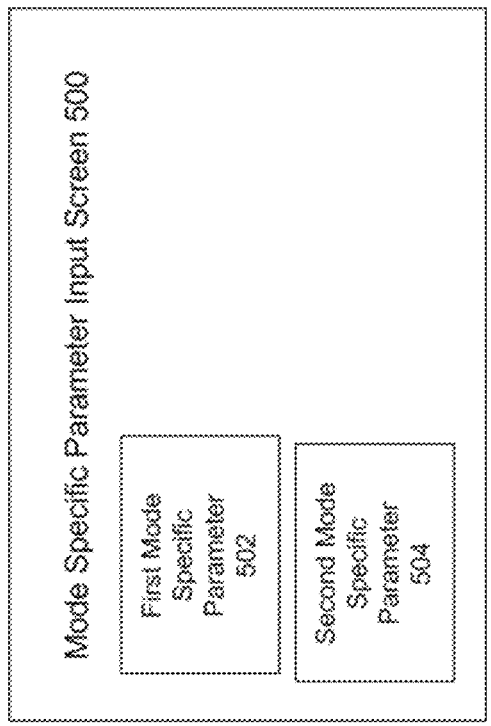
FIG. 5 depicts an example of a mode specific parameter input screen in accordance with aspects of the disclosure.

After a mode selection occurs, the processor 300 may cause the display to display a mode specific parameter input screen 500 (FIG. 5 depicts an example of such a screen). The user or operator may input the mode specific parameters into this screen. For example, the user or operator may type the parameters into specific field boxes on the screen (e.g., 502 and 504). In an aspect of the disclosure, the screen may include default mode specific parameters for the mode. In other aspects of the disclosure, the memory 305 may store the last used mode specific parameters for the mode and display the last used mode specific parameter as a default.

In an aspect of the disclosure, the mode specific parameters for the symmetric mode include, but are not limited to, a slit width and a center wavelength for a phase mask. In an aspect of the disclosure, multiple slits may be used and therefore, multiple slit widths and center wavelengths may be input. In an aspect of the disclosure, the slits may be adjacent to each other. In other aspects, there may be a space between slits.

In an aspect of the disclosure, the mode specific parameters for the asymmetric mode include, but are not limited to, a virtual reflectance R and virtual tilt angle theta $\theta$. In an aspect of the disclosure, the mode specific parameter for delay mode is a delay time.

Figure 6:
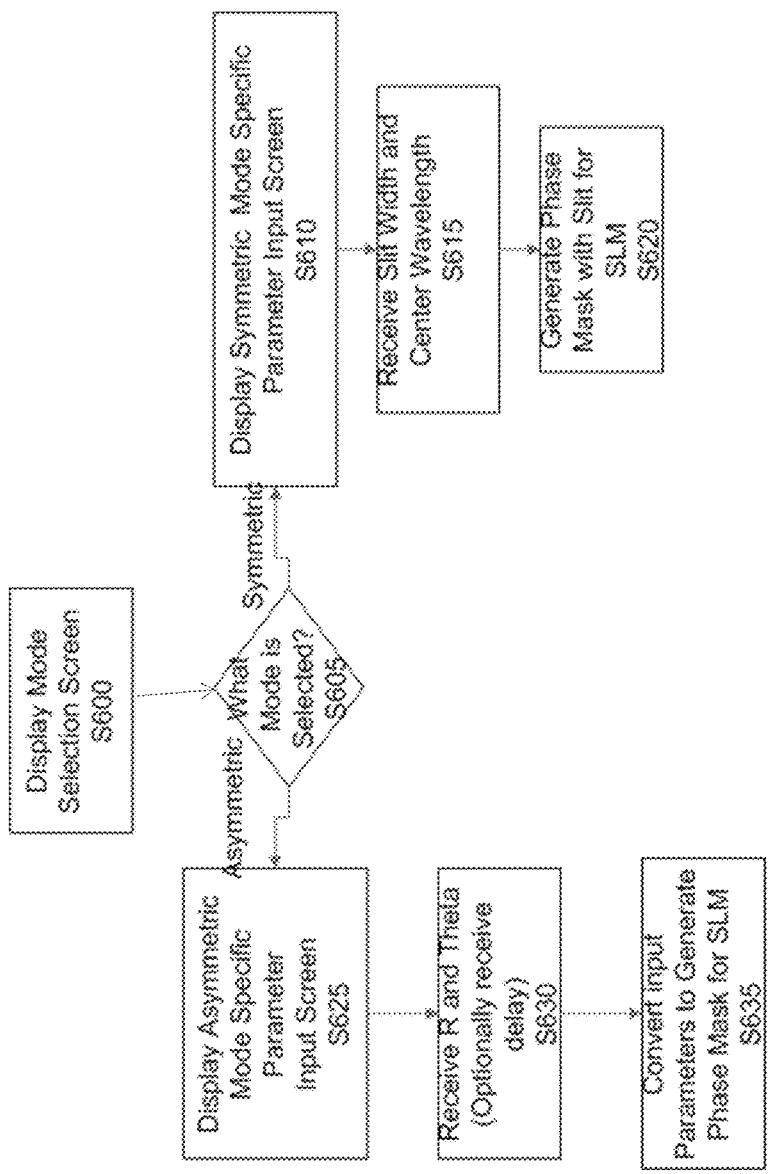
FIG. 6 depicts a flow chart for generating a phase mask for the LCOS SLM in accordance with aspects of the disclosure.

FIG. 6 depicts a flow chart for generating a phase mask to generate the tunable NIR-Shaped light pulses in accordance with aspects of the disclosure. At S600, the processor 300 causes the mode selection screen 400 to be displayed on the display 310. The processor 300 waits for a selection via the input device 315. At S605, the processor 300 determines what mode was selected. In response to the selected mode being symmetric mode, the processor 300 causes the display 310 to display the mode specific parameter input screen 500 for the symmetric mode, e.g., screen for inputting the slit width and center wavelength.

Figure 7:
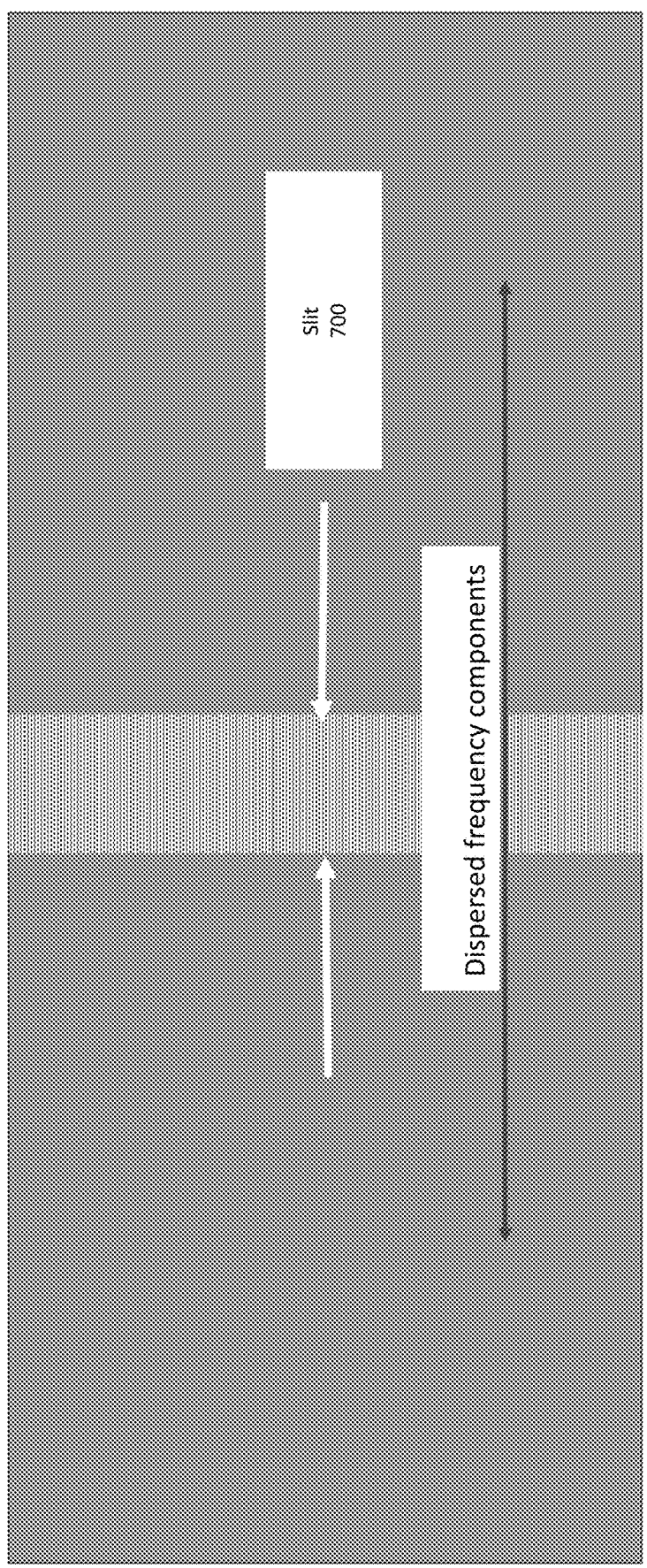
FIG. 7 depicts a representative phase mask for the symmetric mode in accordance with aspects of the disclosure.
Figure 9:
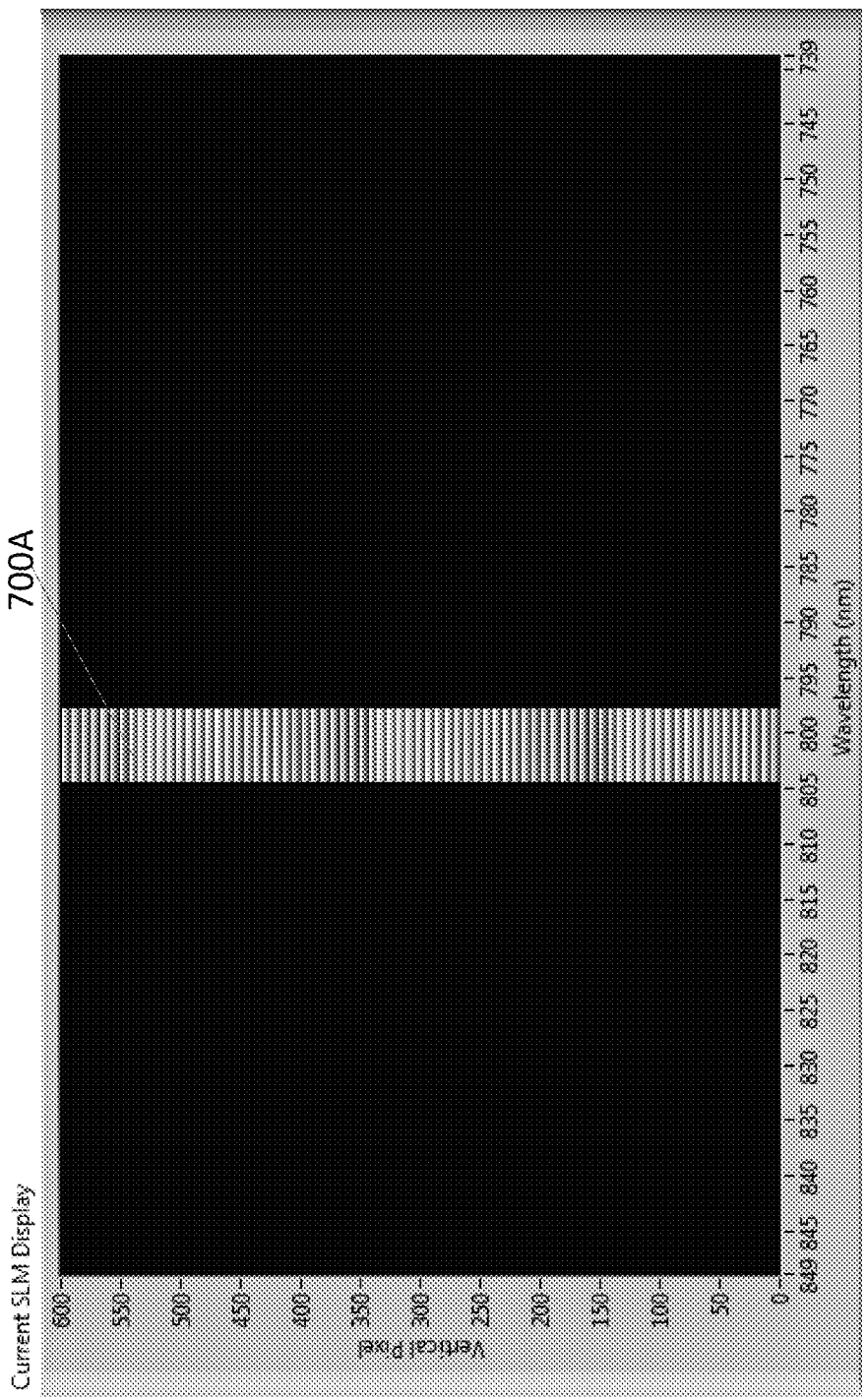
FIG. 9 depicts an example of a phase mask centered about 801 nm and having a width of 25 columns of pixels for the symmetric mode in accordance with aspects of the disclosure.

At S615, the processor 300 receives the input values from the input device 315. In response to receiving the values, the processor 300 generates the phase mask for the LCOS SLM 200 at S620. FIG. 7 shows an example of the phase mask for an LCOS SLM 200 for the symmetric mode. The slit 700 is shown near the center in the left-right direction of an SLM screen. As shown in FIG. 7, the spectral components, e.g., dispersed frequency components, are in the left-right direction. The shorter wavelengths being on one side whereas the longer wavelengths are on the other. Thus, a slit width represents a number of wavelengths desired on the tunable NIR-Shaped light pulses 160. The center wavelength defines the center of the slit 700. The slit 700 comprises a diffraction pattern along the vertical direction. In an aspect of the disclosure, the diffraction pattern is preset. This diffraction pattern diverts light. In an aspect of the disclosure, the same diffraction pattern is used across all horizontal pixels within the slit 700. Therefore, the amplitude and phase of the spectral components within the slit 700 are the same. FIG. 9 depicts a specific example of a slit 700A in accordance with aspects of the disclosure for the symmetric mode. The mode specific parameters were slit width=25 pixels and center wavelength=801. As shown in FIG. 9, the wavelengths (horizontal axes) are from 739 nm to 849 nm. However, the slit 700A only includes wavelengths from approximately 797 nm to 804 nm.

Figure 8:
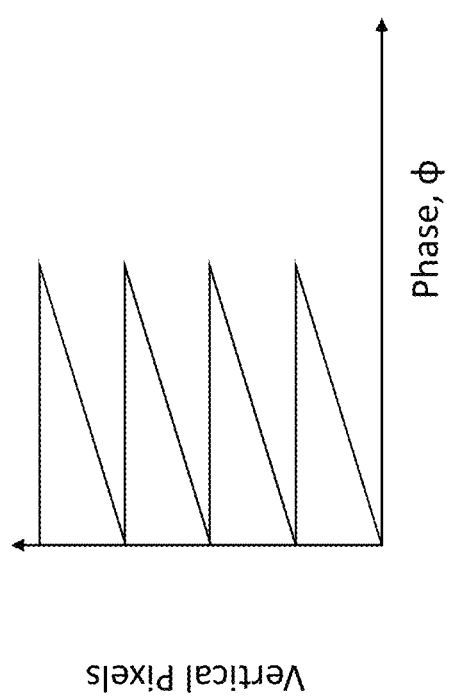
FIG. 8 depicts a representative diffraction pattern in the phase mask in accordance with aspects of the disclosure.

FIG. 8 depicts a representative diffraction pattern for the phase mask, e.g., a preset pattern. This diffraction pattern is for one column of pixels. However, as noted above, in an aspect of the disclosure, the same diffraction pattern is used for each column in the slit 700. The phase is on the horizontal axis. The pattern looks like a saw-tooth pattern. The amplitude of a pixel is determined by a voltage that is set in accordance with the pattern. An amplitude is adjusted by adjusting the dynamic range, e.g., 0-2π verses 0-π (smaller sawtooth). Where the amplitude of spectral components is different, the size of the sawtooth grating would be different for the different spectral components. In an aspect of the disclosure, a user may change the preset pattern for the phase mask. Thus, in accordance with this aspect of the disclosure, the mode specific parameter may also include amplitude (depth) the diffraction pattern for the phase mask, e.g., size of the sawtooth.

The phase is adjusted by adjusting the starting point of the range, e.g., −π-π verses 0-2π. The starting point, e.g., π-π verses 0-2π, is adjusted by shifting the diffractive grating, e.g., sawtooth downward and upward. There are many different options for the adjustment. For example, where a single slit is used, a phase may be adjusted the same for all columns within the slit as desired. Where the phase is adjusted, the phase may be a mode specific parameter (delay mode as described above). In other aspects of the disclosure, where the single slit is used, the phase for different columns may be differently adjusted. This may be used where the slit width is large. In an aspect of the disclosure, the phase and columns may be the mode specific parameter and displayed on the screen 500 for selection. In other aspects of the disclosure, multiple slits may be used and where different phases are used for the different slits. Thus, in accordance with this aspect of the disclosure, the mode specific parameters may specify which slit the phase (delay applies to).

If at S605, the processor 300 determines that the asymmetric mode is selected, the processor 300 causes the mode specific parameter input screen 500 for the asymmetric mode to be displayed on the display 310 at S625, e.g., screen for inputting the reflectance and tilt angle θ. If the delay mode is also selected, the specific parameter input screen 500 may include both mode specific parameters on the same screen, e.g., screen also includes the delay time. At S630, the processor 300 receives the input values from the input device 315. In response to receiving the values, the processor 300 generates the phase mask for the LCOS SLM 200 at S635 by initially creating a virtual etalon. To create an etalon waveform using the SLM, the following transfer function is $$M(\omega) = \frac{1-R}{1-R\cdot\exp[+i(2d\cos\theta/c)\omega]} \quad (3)$$

where R is the reflectance, θ is the tilt angle, and d is the distance between virtual etalon surfaces.

Reflectance impacts the decay time for the pulse (and amplitude). A lower reflectance causes a steeper initial decay. By adjusting θ, a user or operator may select different spectral windows for the tunable NIR-Shaped light pulses 160. A linear phase may be added to the transfer function to delay the asymmetric pulse. By tuning R and θ, the pulses may be tailored for suitability to the sample 150/holder 155 and better resolving power.

In accordance with aspects of the disclosure, the reflectance R and tilt angle θ are converted into parameters for the phase mask (diffraction pattern). Specifically, for a given spectral component, the depth of the vertical grating pattern is changed based on the specified value of reflectance R and tilt angle θ. This alters the amplitude for a given spectral component. The value of reflectance R effectively changes the spectral width for the output pulse. Smaller output spectral widths lead to longer decay times in the asymmetric pulse shape. Likewise, specified values of tilt angle θ and time delay are applied to the overall phase for a given spectral component. This applied phase is converted to a greyscale and results in shifts of the grating pattern.

Figure 10:
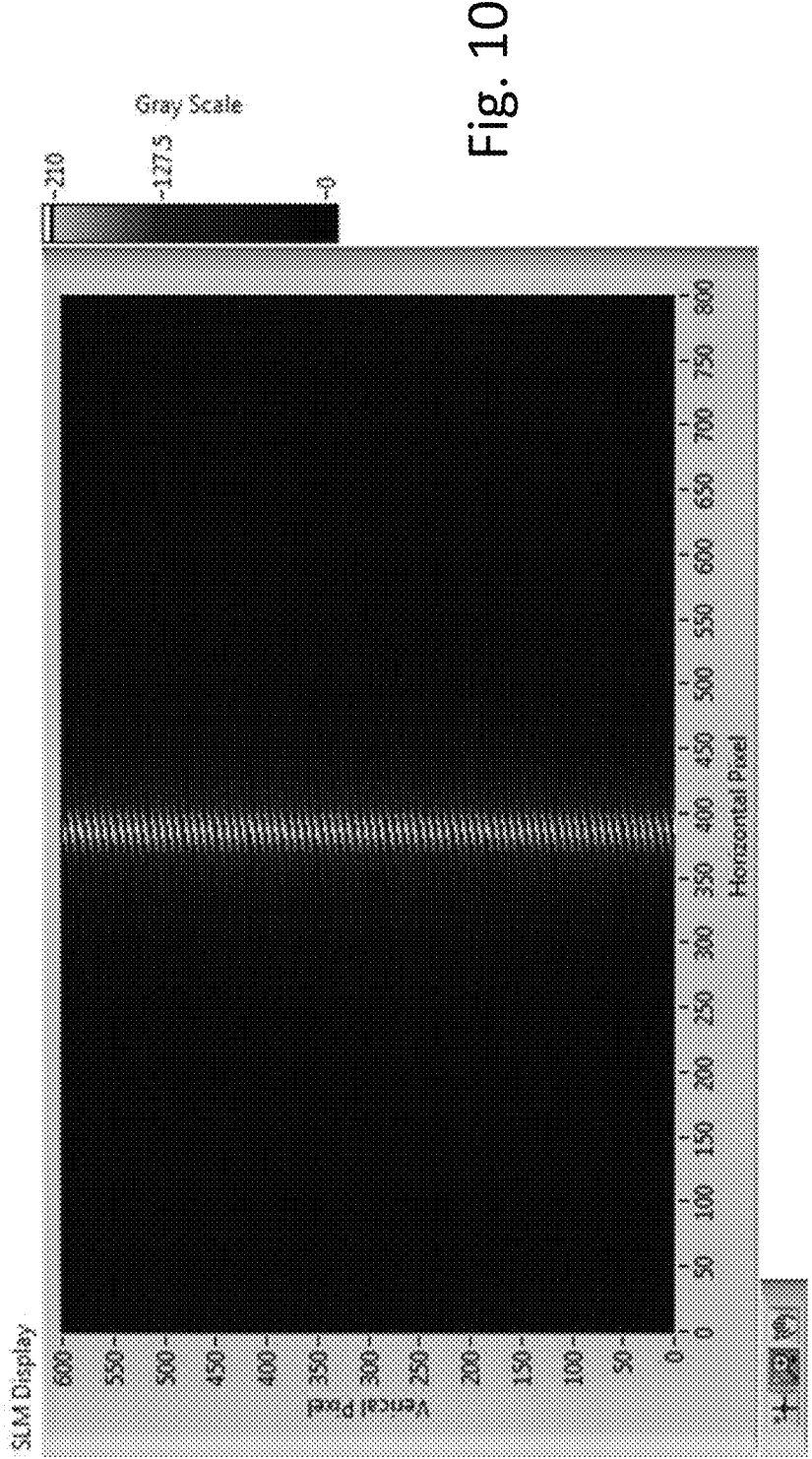
FIG. 10 depicts an example of a phase mask for the asymmetric mode with reflectance=0.95, θ=3.997, and a delay of 250 fs.

FIG. 10 is an example of a phase mask for the asymmetric mode. The mode specific parameters were R=0.95, θ=3.997, and delay=250 fs. As can be seen in FIG. 10, the amplitude and/or phase of the horizontal pixels (spectral components) are different as opposed to being the same in the example depicted in FIG. 9. The phase mask with diffractive grating appears to have a spiral shape (FIG. 10).

FIG. 1 illustrates an example of the system in accordance with aspects of the disclosure. Other optical components may be added to the system as needed based on the OPA, SLM and light source used and orientation, size and shape of the system. For example, when the intensity of the light source 110 is greater than a capability of the OPA and SLM, another beam splitter may be used to reduce the intensity of the light input into the OPA. Light in the split path may be dumped into another OPA or another path via one or more reflectors. In another example, additional reflectors may be added depending on the size of the system and distance between components. Where the size is small, additional reflectors may be used to redirect the light pulses in different directions, as needed. Additionally, periscopes may be used to change a vertical height of the light pulses as needed depending on the relative heights of the optics described herein.

Figure 11:
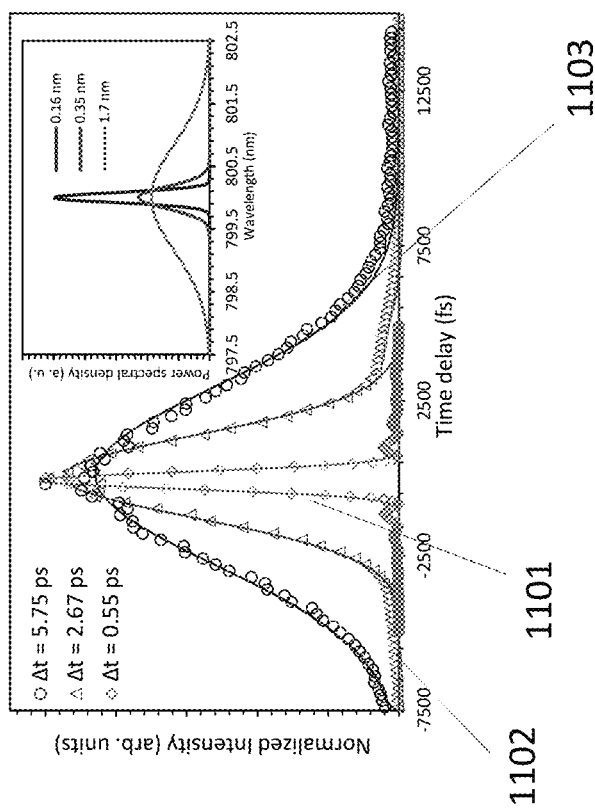
FIG. 11 depicts results of cross-correlation measurements in accordance with aspects of the disclosure where the Mid-IR light pulses and NIR-Shaped light pulses were combined on a GaAs surface with different slit widths and delays. The inset graph depicts a theoretical transform limited bandwidth calculated from the measured pulse durations.

FIG. 11 shows different vSFG pulse durations that were measured by cross-correlation measurements between the NIR-Shaped light pulses 160 and fs broadband Mid-IR light pulses 106 on a GaAs surface as the sample 150 using the above described system 1. The light source 100 was a laser operation at 1 KHz centered around 800 nm. The Mid-IR light pulses 106A were centered at ~2900 cm$^{-1}$ and was ~300 cm$^{-1}$ at full width half maximum (FWHM). The system 1 was operated in a symmetric mode. The slit width was changed for the three measurements shown in FIG. 11. The slit width for the integrated vSFG 1101 was 12; the slit width for the integrated vSFG 1102 was 3; and the slit width for the integrated vSFG 1103 was 1. The center wavelength for each was 799.5 nm. The phase mask (grating) was created based on these parameters.

The curves shown in FIG. 11 are Gaussian fits. The three integrated vSFG signals were achieved using different time delays for the NIR-Shaped light pulses. The first control system 125 was controlled to move the retroreflectors (two bottom mirror) linearly to change the delay time caused by the delay unit 115. The first control system 125 was used to control each half waveplate 137 such that the polarization of all the pulses had a P-polarization.

Using slit widths of 1, 3 and 12 pixels, the system 1 were able to achieve measured spectral bandwidths of 0.26, 0.53, and 1.67 nm, respectively. This produced 5.75, 2.67 and 0.55 ps pulses (FWHM) at the sample. It is noted that for the parameters used, there is a transform limited bandwidth of pulse durations having 0.16, 0.35 and 1.7 nm bandwidths at FWHM, respectively (as shown in the inset of FIG. 11). This corresponds to a lower spectral resolution limit of 2.5 cm$^{-1}$. This spectral resolution limit is approximately 3 times better than certain known vSFG spectrometer measurements.

Figure 12B:
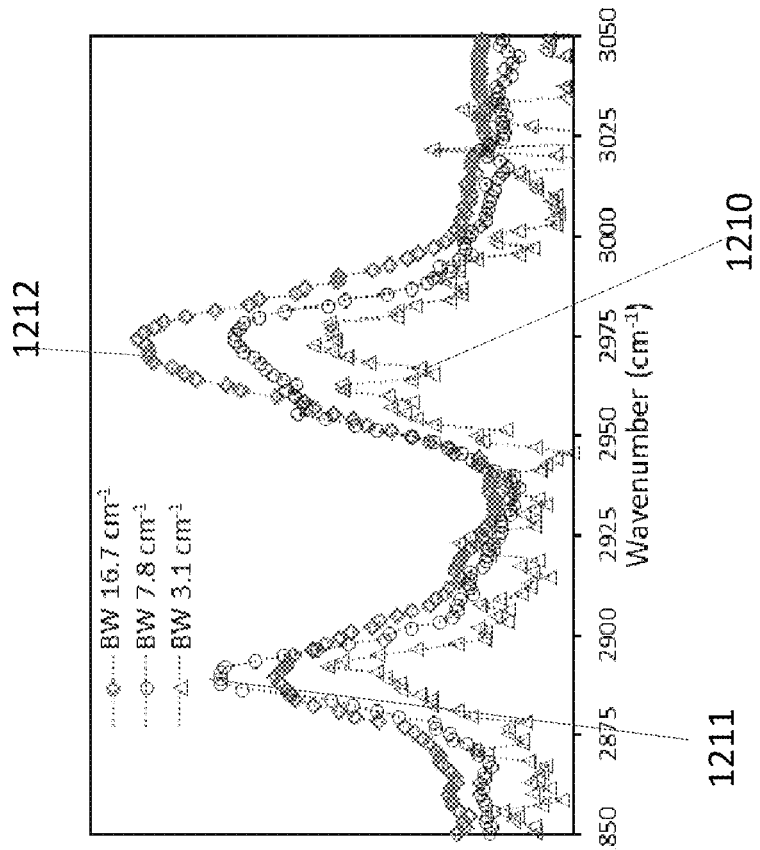
FIG. 12B depicts results of vSFG spectral measurements in accordance with aspects of the disclosure where the Mid-IR light pulses and NIR-Shaped light pulses were combined on dipalmitoylphosphatidylcholine (DPPC) lipid monolayers on a quartz substrate with different slit widths.
Figure 12A:
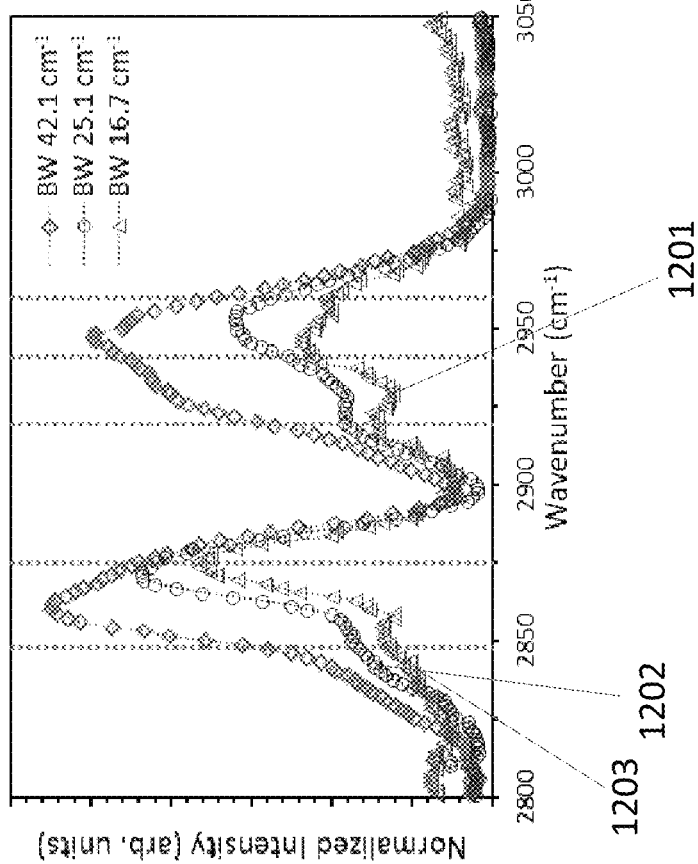
FIG. 12A depicts results of vSFG spectral measurements in accordance with aspects of the disclosure where the Mid-IR light pulses and NIR-Shaped light pulses were combined on a sodium dodecyl sulfate film deposited on a $CaF_2$ window with different slit widths.

FIGS. 12A and 12B show the results of studies on different samples. The spectral results were measured by spectral measurements using the NIR-Shaped light pulses 160 and fs broadband Mid-IR light pulses 106A on a sodium dodecyl sulfate film (air dried) deposited on a $CaF_2$ window. FIG. 12A depicts three different spectral bandwidths: 16.70 $cm^{-1}$ (curve 1201); 25.12 $cm^{-1}$ (curve 1202); and 42.05 $cm^{-1}$ (curve 1203). The light source 100 was a laser operation at 1 KHz centered around 800 nm. The Mid-IR light pulses 106A were centered at ~2900 $cm^{-1}$ and was ~300 $cm^{-1}$ at FWHM. The system 1 was operated in a symmetric mode. The slit width was changed for the three measurements shown in FIG. 12A. Curve 1201 was produced with a slit width of 8; curve 1202 was produced with a slit width of 12; and curve 1203 was produced with a slit width of 20. The center wavelength for the phase mask was 800 nm. The delay time for each measurement was the same. The first control system 125 was operated to control each half waveplate 137 such that the polarization of the NIR-Shaped light pulses 160 has a S-polarization, the fs broadband Mid-IR light pulses 106A had a S-polarization and the vSFG spectra had a S-polarization.

The vSFG spectra(s) were normalized to counts per second and subsequently rescaled. The rescaling was as follows for curve 1201 the rescaling was 7; curve 1202 was 2.5 and curve 1203 was 1. The rescaling was to make the comparison easier. A higher rescaling is needed for the smaller slit width as less light is reflected by the LCOS SLM 200. As can be seen from FIG. 12A, by using the phase mask described herein for the pulse shaper 120, the spectral bandwidth and resolution may be precisely and reproducibly controlled to achieve adequate spectral resolution needed to distinguish neighboring bands. For example, as shown in FIG. 12A, there are five vertical dotted lines. Each line represents different symmetric and asymmetric C-H stretches to be resolved. These five different stretches may be seen using the bandwidth of 16.70 $cm^{-1}$ (curve 1201).

FIG. 12B shows the results of a study with higher spectral resolution (three different resolutions). The spectral results were measured by spectral measurements using the NIR-Shaped light pulses 160 and fs broadband Mid-IR light pulses 106A on dipalmitoylphosphatidylcholine (DPPC) lipid monolayers on a quartz substrate. Same conditions were used as in FIG. 12A other than the slit width. Curve 1210 was produced with a slit width of 2; curve 1211 was produced with a slit width of 4; and curve 1212 was produced with a slit width of 8. The curves 1210-1212 were scaled for comparison. Curve 1210 was scaled by a factor of 10; curve 1211 was scaled by a factor of 5; and curve 1212 was scaled by a factor of 1. The spectral bandwidth for curve 1210 is 3.1 $cm^{-1}$; spectral bandwidth for curve 1211 is 7.8 $cm^{-1}$; and the spectral width for curve 1212 is 16.7 $cm^{-1}$. As illustrated in FIG. 12B, clear bands may be resolved using the higher spectral bandwidth, e.g., 3.1 $cm^{-1}$ (curved 1210). For example, between approximately wavenumber 2950 and 2975 at least two bands are shown (and another between wavenumber 2875 and 2900 and another at approximately 2925). Whereas for a lower bandwidth, e.g., curve 1211 (16.7 $cm^{-1}$), the bands are not clearly resolved. However, longer exposure times are required due to low NIR power reaching the sample 150. The first control system 125 was operated to control each half waveplate 137 such that the polarization of the NIR-Shaped light pulses 160 had a S-polarization, the fs broadband Mid-IR light pulses 106A had a P-polarization and the vSFG spectra had a S-polarization.

Figure 13:
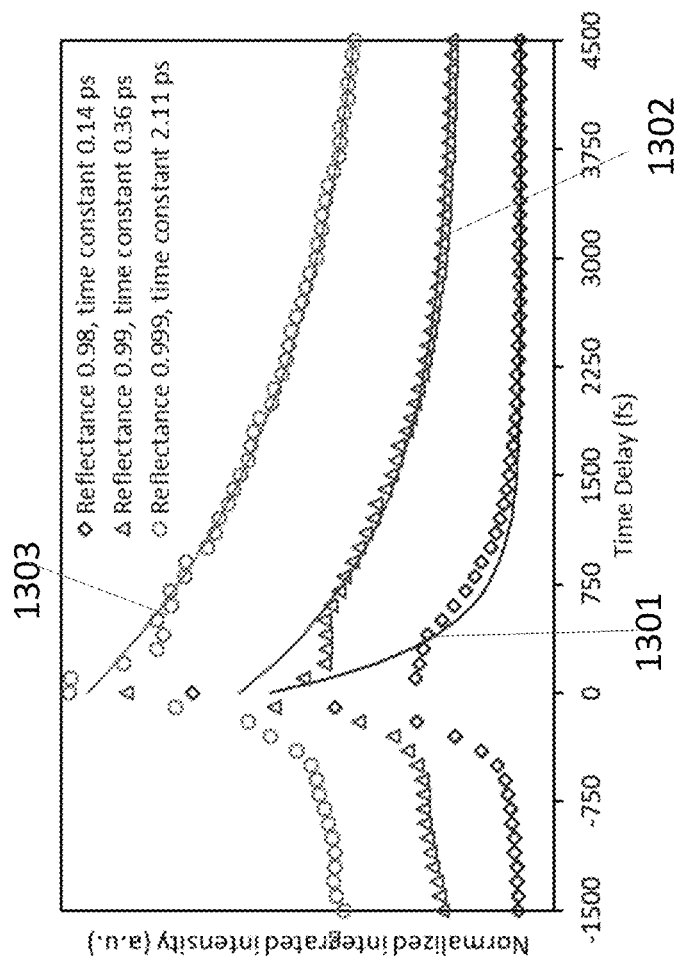
FIG. 13 depicts results of cross-correlation measurements in accordance with aspects of the disclosure where the Mid-IR light pulses and NIR-Shaped light pulses were combined on a GaAs sample, where the NIR-Shaped light pulses are asymmetric pulses, having the reflectance varied to generate the three curves.

FIG. 13 depicts the results of a study when the system 1 is operated in the asymmetric mode for different reflectance(s). The results were measured by cross-correlation measurements between the NIR-Shaped light pulses 160 and fs broadband Mid-IR light pulses 106A on GaAs. As described above, in asymmetric mode, a virtual etalon is generated. For the three curves 1301-1303 shown in FIG. 13, the reflectance was changed; θ remained the same. The first control system 125 was controlled to move the retroreflectors (two bottom mirrors) linearly to change the delay time caused by the delay unit 115. The light source 100 was a laser operation at 1 KHz centered around 800 nm. The Mid-IR light pulses 106A were centered at ~2900 $cm^{-1}$ and was ~300 $cm^{-1}$ at FWHM. The first control system 125 controlled each half waveplate 137 such that the polarization of the pulses had a P-polarization.

As shown, the reflectance R for curve 1301 was 0.98; the reflectance R for curve 1302 was 0.99; and the reflectance R for curve 1303 was 0.999. The data points were fit to exponential decay functions. A decay time of 0.14 ps was recovered for curve 1301; a decay time of 0.36 ps was recovered for curve 1302, and a decay time of 2.11 ps was recovered for curve 1303. It is noted that a decay time of 2.11 ps corresponds to a Lorentzian spectral width on the order of ~0.3 nm, which yields a ~5 $cm^{-1}$ spectral resolution for vSFG measurements. It should be noted that as the effective reflectance increases, the spectral bandwidth available for phase shaping decreases and the resulting pulse shapes become more symmetric.

Figure 14:
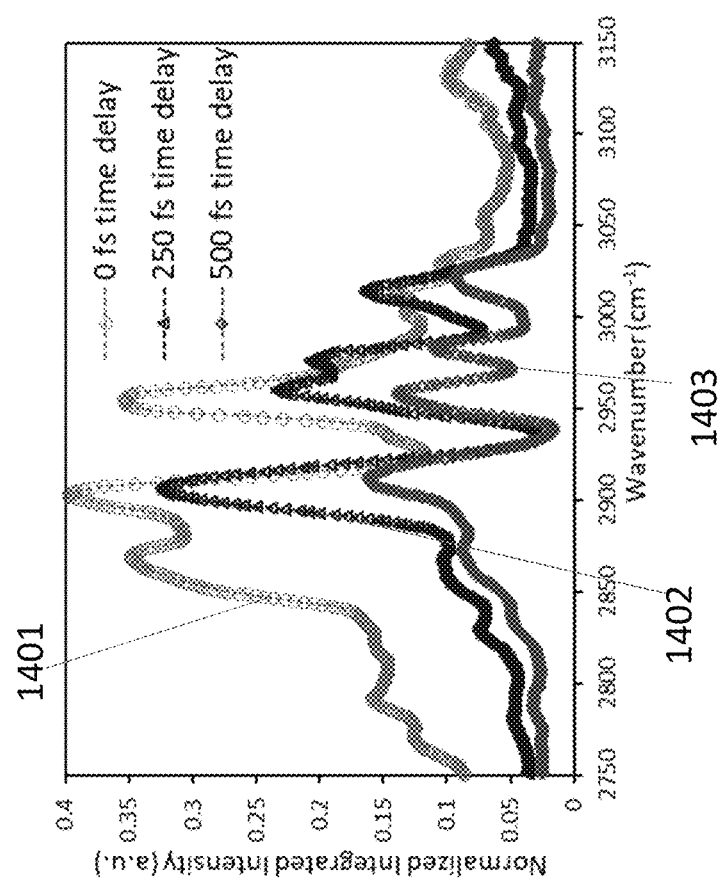
FIG. 14 depicts results of vSFG spectral measurements in accordance with aspects of the disclosure where Mid-IR light pulses and NIR-Shaped light pulses were combined on sugar on a gold substrate where the curves are scaled with respect to a reference generated with symmetric pulses.

FIG. 14 depicts the results of a study when the system 1 is switched from symmetric mode to an asymmetric mode. The symmetric mode is used to map the IR spectral components which then are subsequently used for spectral scaling in the asymmetric mode (results were divided by the reference). This ensures the spectral shapes recovered for the IR pulse used as a reference is free from potential artifacts. The results were measured by spectral measurements using the NIR-Shaped light pulses 160 and fs broadband Mid-IR light pulses 106A on drop cast table sugar on a gold substrate. The symmetric pulse were collected at t=0. In the asymmetric mode, three different time delays were used to generate the three curves. Curve 1401 was generated with a 0 fs time delay for the NIR-Shaped light pulses; Curve 1402 was generated with a 250 fs time delay for the NIR-Shaped light pulses; and curve 1403 was generated with a 500 fs time delay for the NIR-Shaped light pulses. The time delays (phase) were applied using the LCOS SLM 200.

The light source 100 was a laser operation at 1 KHz centered around 800 nm. The Mid-IR light pulses 106A were centered at ~2900 $cm^{-1}$ and were ~300 $cm^{-1}$ at FWHM. The first control system 125 controlled each half waveplate 137 such that the polarization of the pulses had a P-polarization. The same reflectance R and θ was used for each curve 1401-1403. R=0.999 and θ=3.997 for each curve. As can be seen from FIG. 14, when zero delay was used, the nonresonant response of the gold substrate (e.g., background) is present, e.g., shown at wavenumbers below 2900 $cm^{-1}$. However, the nonresonant response was suppressed by using the delays, e.g., curves 1402 and 1403. This leaves the longer lived vibrational coherences that decay on the order of a few ps timescales to be upconverted by the NIR-Shaped light pulses. The combination of the delay with the asymmetric mode effectively suppressed the nonresonant response while ensuring that the spectral characteristics are representative of the Mid-IR light pulses 106A. In this setup, an optimal delay between the two pulses, NIR-Shaped light pulses 160 and Mid-IR light pulses 106A was on the order of 250-500 fs, in order to discriminate against the short-lived electronic responses from gold substrate.

Figure 15:
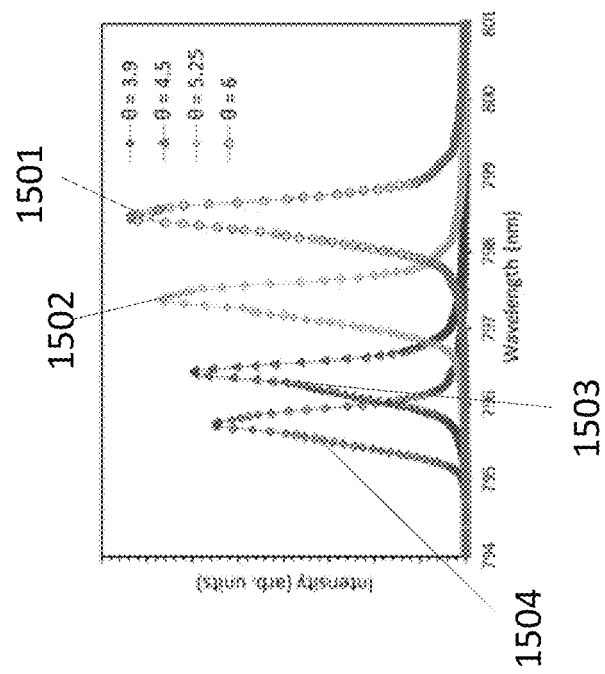
FIG. 15 depicts an ability to select different spectral windows as a function of θ.

FIG. 15 shows that the spectral window(s) of the NIR-Shaped light pulses may be changed by adjusting θ. FIG. 15 depicts four different central wavelengths of Pulses as would be seen at the spectrometer. The four central wavelengths are generated with four different θ's. Curve 1501 was generated using θ=6; curve 1502 was generated using θ=5.25; curve 1503 was generated using θ=4.5; and curve 1504 was generated using θ=3.9. The virtual reflectance R was the same for all curves, R=0.99. No linear delay was used. The theta control provides variable control over central wavelength and the associated spectral resolution that is not possible using a fixed etalon.

Figure 16:
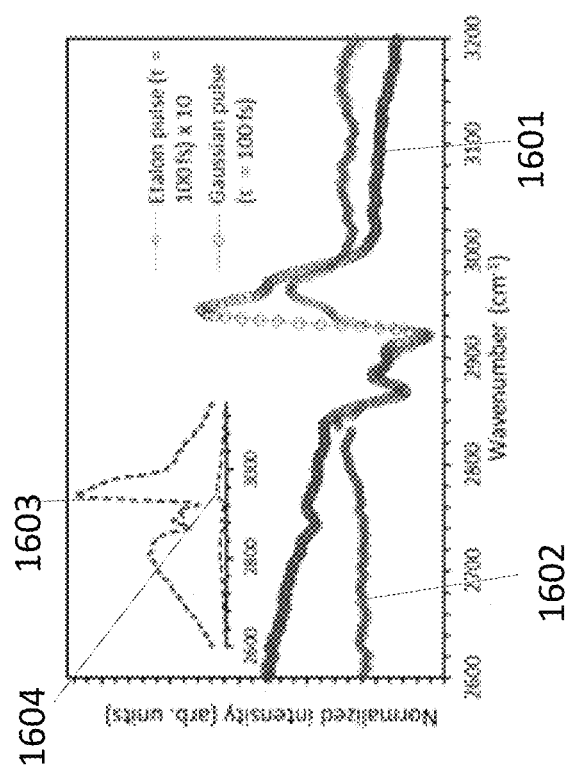
FIG. 16 depicts results of cross-correlation measurements in accordance with aspects of the disclosure where the Mid-IR light pulses and NIR-Shaped light pulses were combined and emitted on propylene carbonate on a gold substrate film using symmetric and asymmetric NIR-Shaped light pulses, respectively.

FIG. 16 depicts results of studies using both symmetric and asymmetric modes on the same sample. The sample was propylene carbonate on gold films. Propylene carbonate is an organic solvent routinely used as a high-permittivity component of electrolytes in lithium-ion batteries. The gold substrate produces a substantial amount of nonresonant background making some molecular vibrations challenging to measure due to the overwhelming background response.

The study conditions were the same for both modes, e.g., same light source as described above. The first control system 125 was used to control each half waveplate 137 such that the polarization of the NIR-Shaped light pulses 160 and Mid-IR light pulses 106A was S-polarization and the polarization of the vSFG spectra was P-polarization. A delay of the NIR-Shaped light pulses was achieved by the LCOS SLM. 200

For the symmetric mode, the slit width was 8 and the center wavelength was 800 nm (achieving a bandwidth of 16.7 cm$^{-1}$). For the asymmetric mode, the reflectance R was 0.99 and θ was 3.997. The asymmetric pulse had a decay constant of ~1.9 ps.

Curve 1601 is the vSFG spectra for the symmetric mode and curve 1602 is a scaled vSFG spectra for the asymmetric mode. The curve 1602 was scaled by 10 for visual comparison. The inset shows unscaled curves 1603 (symmetric) and 1604 (asymmetric). As can be seen the magnitude of the vSFG spectra for the symmetric mode is higher than the magnitude of the vSFG spectra for the asymmetric mode. This is in part attributed to the nonresonant signal from the gold substrate being much higher in the symmetric mode as compared to the asymmetric mode (suppressed). This is particularly shown below wavenumber 2950 cm$^{-1}$.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A vibrational sum frequency generation spectroscopy system comprising:
   a near infrared (NIR) light source configured to emit light pulses centered at a preset wavelength;
   a beam splitter disposed in a path of the emitted light and configured to split the emitted light into first light pulses and second light pulses;
   an optical parametric amplifier (OPA) disposed in a path of the first light pulses and configured to convert the first light pulses into a Mid-IR light pulses via difference frequency mixing;
   a pulse shaper disposed in a path of the second light pulses and configured to output a tunable NIR light pulses, by adjusting at least one of a number of spectral components, an amplitude and phase of the second light pulses;
   a processor configured to control the pulse shaper based on mode specific parameters input by a user via a user interface, the mode specific parameters are specific to a mode of operation, the mode of operation comprises symmetric and asymmetric mode, in the symmetric mode, the pulse shaper is configured to output time-symmetric pulses and in the asymmetric mode, the pulse shaper is configured to output time-asymmetric pulses;
   an optical system configured to combine the Mid-IR light pulses output by the OPA which has been polarized and rotated and the tunable NIR light pulses output by the pulse shaper which has been polarized and rotated;
   a lens configured to focus the combined light onto a target sample; and
   a light detector configured to detect light reflected by the target sample which has been focused, polarized and rotated.

2. The vibrational sum frequency generation spectroscopy system according to claim 1, wherein the pulse shaper comprises:
   a transmission grating disposed in the path of the second light pulses and configured to separate the second light pulses into its spectral components forming a dispersed beam;
   a folding mirror configured to reflect the dispersed beam;
   a cylindrical mirror configured to focus the dispersed beam which has been reflected by the folding mirror; and
   a liquid crystal on silicon spatial light modulator (LCOS SLM) configured to receive the dispersed beam and adjust at least one of a number of spectral components, an amplitude and phase of the second light pulses.

3. The vibrational sum frequency generation spectroscopy system according to claim 2, wherein the LCOS SLM is disposed on a Fourier plane of the dispersed and focused beam.

4. The vibrational sum frequency generation spectroscopy system according to claim 3, wherein the LCOS SLM produces a plurality of rows and columns of pixels, wherein when in symmetric mode, the mode specific parameters comprises a slit width and a center wavelength, the slit width being a number of columns of pixels allowed, where the number of spectral components in the tunable NIR light pulses is determined by the slit width.

5. The vibrational sum frequency generation spectroscopy system according to claim 4, wherein the processor is configured generated a phase mask for the LCOS SLM based the slit width.

6. The vibrational sum frequency generation spectroscopy system according to claim 5, wherein the amplitude and the phase for each column of pixels included in the phase mask is the same.

7. The vibrational sum frequency generation spectroscopy system according to claim 6, wherein the amplitude is adjusted by controlling a dynamic range of an applied voltage to rotate the liquid crystals for the columns of pixels using the phase mask.

8. The vibrational sum frequency generation spectroscopy system according to claim 6, wherein the processor is configured to adjust the phase by controlling a starting point of a dynamic range of an applied voltage to rotate the liquid crystals for the columns of pixels using the phase mask.

9. The vibrational sum frequency generation spectroscopy system according to claim 1, wherein the asymmetric mode is selected when the target sample is located on a metallic or semiconducting surface.

10. The vibrational sum frequency generation spectroscopy system according to claim 1, further comprising a delay mirror system disposed in the path of one of the first light pulses and the second light pulses, the delay mirror system is configured to cause the tunable NIR light pulses output by the pulse shaper and the Mid-IR light pulses output by the OPA to reach the target sample at the same time.

11. The vibrational sum frequency generation spectroscopy system according to claim 1, further comprising: a beam reducer disposed in the path of the second light pulses and configured to reduce the diameter of the second light pulses.

12. The vibrational sum frequency generation spectroscopy system according to claim 11, further comprises a band pass optical filter disposed in the path of the second light pulses.

13. The vibrational sum frequency generation spectroscopy system according to claim 1, the optical system comprises a dichroic mirror.

14. The vibrational sum frequency generation spectroscopy system according to claim 1, wherein the symmetric mode is used when the target sample is located on an insulating surface.

15. The vibrational sum frequency generation spectroscopy system according to claim 1, wherein in the asymmetric mode, a virtual etalon is generated and the mode specific parameters comprises a reflectance and a virtual tilt angle, the number of specific components and decay time being based on the reflectance and a center wavelength being based on the virtual tilt angle.

16. The vibrational sum frequency generation spectroscopy system according to claim 15, wherein the LCOS SLM produces a plurality of rows and columns of pixels, wherein the processor is configured generated a phase mask for the LCOS SLM based on the reflectance and the virtual tilt angle.

17. The vibrational sum frequency generation spectroscopy system according to claim 16, wherein different columns of pixels in the phase mask has different amplitudes and phases.

18. The vibrational sum frequency generation spectroscopy system according to claim 16, wherein the processor is further configured to generate the phase mask to delay the tunable NIR light pulses with respect to the Mid-IR light pulses by adding a linear phase to each column of pixels.

19. The vibrational sum frequency generation spectroscopy system according to claim 1, further comprising a user interface displayable on a display, the user interface is configured to receive a mode selection for the mode of operation and the mode specific parameters.

* * * * *